UNITED STATES PATENT OFFICE.

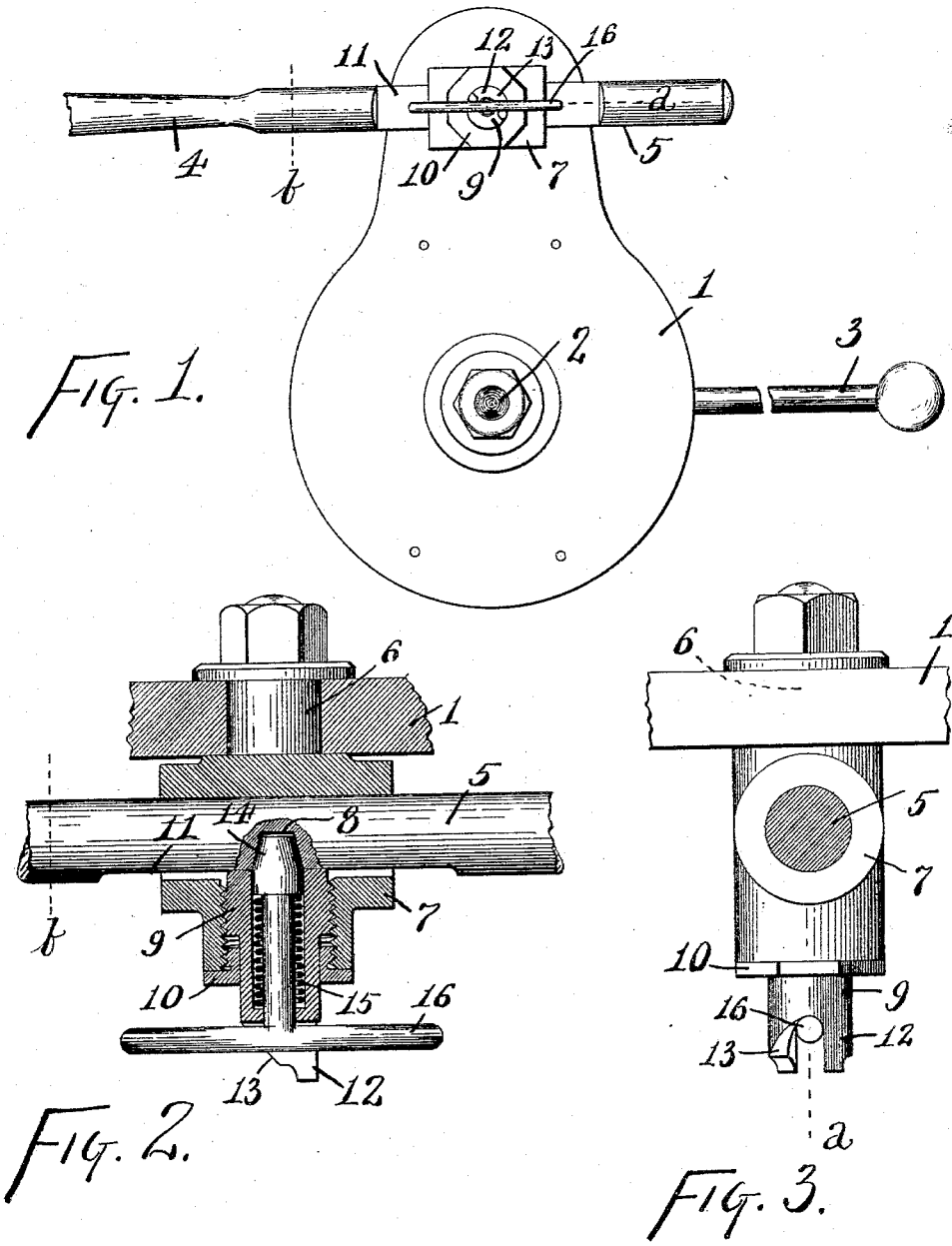

FREDERICK W. GORDON, OF PHILADELPHIA, PENNSYLVANIA, ASSIGNOR TO THE PHILADELPHIA ENGINEERING WORKS, LIMITED, OF SAME PLACE.

VALVE-GEAR CLUTCH.

SPECIFICATION forming part of Letters Patent No. 556,817, dated March 24, 1896.

Application filed January 29, 1896. Serial No. 577,259. (No model.)

*To all whom it may concern:*

Be it known that I, FREDERICK W. GORDON, of Philadelphia, Philadelphia county, Pennsylvania, have invented certain new and useful Improvements in Valve-Gear Clutches, of which the following is a specification.

This invention relates to that class of devices employed in the valve-gearing of steam-engines, &c., where a reciprocating rod, as an eccentric-rod, gives oscillating motion to a rocker-arm under conditions which require that the rod may, when desired, be uncoupled from the rocker-arm. Devices of this class for detachably connecting the rod with the rocker-arm are often spoken of in a general way as "cam-hooks."

My improvements will be readily understood from the following description, taken in connection with the accompanying drawings, in which—

Figure 1 is a side elevation of my improved valve-gear clutch shown as in connection with the wrist-plate of a Corliss engine; Fig. 2, a section thereof in the plane of line *a* of Figs. 1 and 3; and Fig. 3, a side elevation of the clutch, the rod appearing in vertical section in the plane of line *b* of Figs. 1 and 2.

In the drawings, 1 indicates the ordinary wrist-plate of a Corliss valve-gear; 2, the stud on which it oscillates; 3, a handle by which the wrist-plate can be rocked by hand when the clutch is disconnected; 4, the reciprocating rod which gives motion to the rocker-arm; 5, a parallel portion of this rod where it engages the rocker-arm; 6, a journal engaging a bearing in the rocker-arm; 7, a head carried by this journal and having a bore in which rod 4 may freely slide; 8, a dowel-hole in rod 4 in about the axial line of journal 6 when the rod is clutched to the rocker-arm; 9, a clamp-screw threaded into the head 7 and impinging with its inner end against rod 4 and firmly clamping the rod to the head 7; 10, a follower secured in head 7 and limiting the retreat of clamp-screw 9 when the clamp-screw is screwed outwardly; 11, a flattened face upon rod 4 where it engages the head 7, this flattened face being designed to give a firm bearing of clamp-screw 9 against the rod, the flattened portion having, preferably, a length equal at least to twice the stroke of the rod; 12, a pair of jaws formed by slotting the outer end of the shank of clamp-screw 9, this slot extending transversely across the end of the shank of the screw; 13, inclined or spiral faces for these jaws; 14, a dowel-pin fitting hole 8 and having a shank projecting axially through the clamp-screw 9, this pin being adapted for motion into and out of engagement with the dowel-hole in the rod; 15, a spring urging the dowel-pin inwardly into engagement with the hole in the rod, and 16 a handle cross-bar upon the outer end of the dowel-pin, this cross-bar lying between the jaws 12 and being adapted to ride out upon the inclines 13 if the cross-bar be turned in a certain direction, against the sun in the example shown.

With the parts in the position shown in Fig. 2 the dowel-pin is engaging the hole in the rod and held in such engagement by its spring, and the rod is thus clutched to the head 7 and rocker-arm with such firmness and solidity as may be within the capacity of the dowel-pin and its spring. At the same time clamp-screw 9 is impinging against the outer face of the rod and rigidly clamping it in the head 7. Under these conditions the reciprocating rod will endow the rocker-arm with oscillations, as in the normal working of the valve-gear.

If, now, cross-bar handle 16 be turned against the sun, the dowel-pin and the clamp-screw will be turned, the dowel-pin turning idly in the hole in the rod and the clamp-screw retreating and releasing the rod from its clamping effect, leaving the dowel-pin still engaged with the rod. The dowel-pin may now be retracted by pulling outwardly from the cross-bar handle, thus releasing the rocker-arm from the motion influences of the rod and permitting the rocker to rest or to be operated by hand; but when cross-bar handle 16 is turned to release clamp-screw 9 from the rod the turning motion of the clamp-screw can continue only till the retreat of the clamp-screw is limited by follower 10. If, now, the turning motion of the cross-bar handle be continued, the cross-bar will ride screw-like the spiral inclines 13 and the dowel-pin will be withdrawn from the hole in the rod, and be held in that position by flat terminals of the spiral inclines. The dowel-pin, when withdrawn from the hole, is thus held in position of retreat. A simple turning motion of the cross-bar handle may thus be employed in first releasing the clamp-screw, in next retracting the dowel-pin, and in next locking the dowel-pin in position of release. When the clutch is thus released and it is desired again to engage it, cross-bar handle is turned a trifle with the sun, thus permitting the spring to draw it inwardly on the spiral inclines and force the dowel-pin into the hole of the rod, and if the turning of the handle be continued the clamp-screw will be set firmly against the face of the rod. The dowel-pin may thus be used with or without the co-operation of the clamping action of the clamp-screw.

I claim as my invention—

1. In a valve-gear clutch, the combination, substantially as set forth, of a head pierced for a reciprocating rod, a rod engaging said head and having a dowel-hole, a spring dowel-pin mounted in the head and adapted to engage said dowel-hole, and a clamp-screw carried by the head and engaging the rod.

2. In a valve-gear clutch, the combination, substantially as set forth, of a head pierced for a reciprocating rod, a rod engaging the head and having a dowel-hole, a clamp-screw carried by the head and adapted to engage the rod, and a spring dowel-pin mounted axially within the clamp-screw and adapted to engage the dowel-hole in the rod.

3. In a valve-gear clutch, the combination, substantially as set forth, of a head pierced for a reciprocating rod, a rod adapted to slide in said head and having a dowel-hole, a spring dowel-pin mounted for rotary and endwise motion in the head and adapted to engage the dowel-hole in the rod, a cross-bar handle on the dowel-pin, and an incline carried by the head and adapted to be engaged screw-like by said cross-bar as the dowel-pin is turned.

4. In a valve-gear clutch, the combination, substantially as set forth, of a head pierced for a reciprocating rod, a rod adapted to slide in the head and having a dowel-hole, a clamp-screw carried by the head and arranged to impinge upon the rod and clamp it to the head, a spring dowel-pin carried by the head and adapted to engage the dowel-hole in the rod, and a handle engaging the dowel-pin and clamp-screw and adapted to serve as a means by which the dowel-pin may be moved endwise or the clamp-screw turned.

5. In a valve-gear clutch, the combination, substantially as set forth, of a head pierced for a reciprocating rod, a rod adapted to slide therein and having a dowel-hole, a clamp-screw carried by the head and adapted to clamp the rod and having the end of its shank transversely slotted, a spring dowel-pin axially mounted in the clamp-screw and adapted to engage the hole in the rod, and a cross-bar handle on the dowel-pin lying in the slot of the clamp-screw.

6. In a valve-gear clutch, the combination, substantially as set forth, of a head pierced for a reciprocating rod, a rod adapted to slide in the head and having a dowel-hole, a clamp-screw mounted in the head and adapted to clamp the rod and having the end of its shank slotted and provided with facial inclines, a spring dowel-pin mounted axially in the clamp-screw, and a cross-bar handle attached to the dowel-pin and lying in the slot of the clamp-screw and adapted to ride the facial inclines thereof.

FRED. W. GORDON.

Witnesses:
VICTOR O. STROBEL,
J. POWELL ATKINSON.